United States Patent
Eckel et al.

(10) Patent No.: US 10,961,354 B1
(45) Date of Patent: Mar. 30, 2021

(54) FORMULATIONS FOR 3D PRINTING OF HYDROSILYLATION-MODIFIED POLYSILAZANES

(71) Applicant: HRL Laboratories, LLC, Malibu, CA (US)

(72) Inventors: Zak C. Eckel, Thousand Oaks, CA (US); Ashley M. Dustin, Los Angeles, CA (US); April R. Rodriguez, Santa Monica, CA (US); Phuong Bui, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 219 days.

(21) Appl. No.: 16/029,526

(22) Filed: Jul. 6, 2018

Related U.S. Application Data

(60) Provisional application No. 62/554,623, filed on Sep. 6, 2017.

(51) Int. Cl.
| | |
|---|---|
| *C08G 77/62* | (2006.01) |
| *C04B 35/571* | (2006.01) |
| *C04B 35/589* | (2006.01) |
| *B28B 1/00* | (2006.01) |
| *B33Y 80/00* | (2015.01) |
| *C04B 35/597* | (2006.01) |
| *B33Y 10/00* | (2015.01) |

(52) U.S. Cl.
CPC ............. *C08G 77/62* (2013.01); *B28B 1/001* (2013.01); *B33Y 80/00* (2014.12); *C04B 35/571* (2013.01); *C04B 35/589* (2013.01); *C04B 35/597* (2013.01); *B33Y 10/00* (2014.12); *C04B 2235/602* (2013.01)

(58) Field of Classification Search
CPC ... C04B 35/597; C04B 35/584; C04B 35/571; B33Y 10/80; B33Y 10/10; B33Y 1/001; C08G 77/62
See application file for complete search history.

(56) References Cited

U.S. PATENT DOCUMENTS

| | | | |
|---|---|---|---|
| 4,395,460 A | 7/1983 | Gaul | |
| 4,575,330 A | 3/1986 | Hull | |
| 4,720,532 A * | 1/1988 | Seyferth | C04B 35/571 501/88 |
| 4,816,497 A | 3/1989 | Lutz et al. | |
| 5,001,090 A | 3/1991 | Schwark | |
| 5,153,295 A | 10/1992 | Whitmarsh et al. | |
| 5,612,414 A * | 3/1997 | Becker | C08G 18/10 525/102 |
| 5,616,650 A * | 4/1997 | Becker | C08G 77/62 525/102 |
| 5,698,485 A | 12/1997 | Bruck et al. | |
| 6,573,020 B1 | 6/2003 | Hanemann et al. | |
| 7,582,685 B2 | 9/2009 | Arney et al. | |
| 10,196,464 B1 * | 2/2019 | Zhou | C08F 28/02 |
| 2002/0042491 A1 | 4/2002 | Brader et al. | |
| 2006/0069176 A1 * | 3/2006 | Bowman | C04B 35/584 522/1 |
| 2019/0002353 A1 * | 1/2019 | Eckel | C04B 35/524 |

FOREIGN PATENT DOCUMENTS

EP    0442013 B1    6/1996

OTHER PUBLICATIONS

TB2: KiON® Ceraset® Polyureasilazane and KiON® Ceraset® Polysilazane 20, 2008.

* cited by examiner

*Primary Examiner* — Sanza L. McClendon
(74) *Attorney, Agent, or Firm* — O'Connor & Company

(57) ABSTRACT

Some variations provide a preceramic resin precursor formulation comprising: first molecules comprising at least one Si—C bond and/or at least one Si—N bond, wherein the first molecules include at least one silyl hydride group (Si—H) available for hydrosilylation; and second molecules with at least one unsaturated carbon-carbon bond attached to a UV-active functional group. The first molecules and second molecules may be reacted, via hydrosilylation with a homogeneous or heterogeneous metal-containing catalyst, to produce third molecules comprising a hydrosilylation-modified polysilazane that contains the UV-active functional group. Many possible starting formulations are described, and methods are disclosed for carrying out the chemical reactions to generate the hydrosilylation-modified polysilazanes. The hydrosilylation-modified polysilazanes may then be 3D-printed and thermally treating to fabricate a ceramic material.

20 Claims, No Drawings

000
FORMULATIONS FOR 3D PRINTING OF HYDROSILYLATION-MODIFIED POLYSILAZANES

PRIORITY DATA

This patent application is a non-provisional application with priority to U.S. Provisional Patent App. No. 62/554,623, filed Sep. 6, 2017, which is hereby incorporated by reference herein.

FIELD OF THE INVENTION

The present invention generally relates to certain formulations suitable for making preceramic polymers, which can be converted into ceramic structures.

BACKGROUND OF THE INVENTION

In comparison with metals and polymers, ceramics are difficult to process, particularly into complex shapes. Because they cannot be cast or machined easily, ceramics are typically consolidated from powders by sintering or deposited in thin films. Flaws, such as porosity and inhomogeneity introduced during processing, govern the strength because the flaws initiate cracks, and—in contrast to metals—brittle ceramics have little ability to resist fracture. This processing challenge has limited the ability to take advantage of ceramics' impressive properties, including high-temperature capability, environmental resistance, and high strength.

Ceramic matrix composite (CMC) materials overcome many disadvantages of conventional ceramics, such as brittle failure, low fracture toughness, and limited thermal shock resistance. Applications of ceramic matrix composites include those requiring reliability at high temperatures (beyond the capability of metals or polymers) and resistance to corrosion and wear.

Recent advances in additive manufacturing have led to a multitude of different techniques, but additive manufacturing techniques developed for ceramic materials only process unreinforced ceramics and not ceramic matrix composites. Only a few of the commercially available three-dimensional (3D) printing systems offer printing of ceramics, either by selective curing of a photosensitive resin that contains ceramic particles, selective deposition of a liquid binder agent onto ceramic particles (binder jetting), or selective fusion of a powder bed with a laser. All these techniques are limited by slow fabrication rates, and in many cases, a time-consuming binder removal process. By starting with powders that need to be consolidated to a dense part, it is an almost insurmountable challenge to add reinforcement and create ceramic matrix composites without fusing or reacting the matrix and the second phase, losing reinforcing capability. Furthermore, many additive manufacturing processes introduce large thermal gradients that tend to cause cracks in ceramics. Pores, cracks, and inhomogeneities are often responsible for the low strength and poor reliability of additively manufactured ceramic parts.

No mature method for 3D printing of ceramic matrix composites exists. Currently, CMC materials are limited to manual lay-up, molding, or thermoforming. There are also known techniques for sintering ceramic particles or using ceramic particles printed in an organic binder, both of which typically produce porous ceramics that have lower strength than the parent material. Ceramic structures are typically sintered as compacted porous materials, severely limiting the manufacturable geometries.

Formulations have been described for creating ceramic materials that can be printed (additively manufactured) with various methods such as stereolithography techniques and laser sintering. These are typically unreinforced ceramics that do not contain a second phase and suffer from low fracture toughness. These methods are described in Zocca et al., "Additive Manufacturing of Ceramics: Issues, Potentialities, and Opportunities" *J. Am. Ceram. Soc.,* 98 [7] 1983-2001 (2015).

In addition, formulations which can create 1D or 2D ceramics, or very small 3D structures, have been described. See U.S. Pat. No. 4,816,497 issued Mar. 28, 1989 to Lutz et al.; U.S. Pat. No. 5,698,485 issued Dec. 16, 1997 to Bruck et al.; U.S. Pat. No. 6,573,020 issued Jun. 3, 2003 to Hanemann et al.; U.S. Pat. No. 7,582,685 issued Sep. 1, 2009 to Arney et al.; and U.S. Patent App. Pub. No. US2006/0069176A1 published Mar. 30, 2006 to Bowman et al.

Preceramic polymers are a class of polymers which allow, via a thermal treatment, a conversion of a polymer part to a ceramic material. Typically, these preceramic polymers contain silicon (Si) in the molecular backbone, with the resulting material containing Si. There are a wide variety of known preceramic polymers. Examples include polysilazanes, borazine-modified hydridopolysilazanes, polysilanes, polycarbosilanes, silicone resins, polyborazines, polyvinylborazine, polyborazylene, and decaborane-based polymers. These preceramic polymers have been used to form specific polymer-based structures that can be subsequently heat-treated (pyrolyzed or sintered) to create near net-shape ceramic structures.

A stereolithography technique provides a method to build a 3D polymer microstructure in a layer-by-layer process. This process usually involves a platform (e.g., substrate) that is lowered or raised into a photomonomer bath in discrete steps. At each layer, a laser is used to scan over the area of the photomonomer that is to be cured (i.e., polymerized) for that particular layer. Once the layer is cured, the platform is lowered or raised by a specific amount, determined by the processing parameters and desired feature/surface resolution, and the process is repeated until the complete 3D structure is created. One example of such a stereolithography technique is disclosed in U.S. Pat. No. 4,575,330 issued Mar. 11, 1986 to Hull et al.

Modifications to the above-described stereolithography technique have been developed to improve the polymer resolution by using laser optics and special resin formulations. Also, modifications have been made to decrease the fabrication time of the 3D polymer structure by using a dynamic pattern generator to cure an entire layer at once. One example of such a modification is disclosed in Bertsch et al., "Microstereo-lithography: A Review" *Materials Research Society Symposium Proceedings*, Vol. 758, 2003. Another advancement to the standard stereolithography technique includes a two-photon polymerization process, as disclosed in Sun et al., "Two-Photon Polymerization and 3D Lithographic Microfabrication" *Advances in Polymer Science*, Vol. 170, 169-273, 2004.

There exists a need for creating ceramic parts of various sizes through 3D printing, for engineering and other applications, without relying on either sintering of ceramic particles or the use of ceramic particles printed in an organic binder, both of which produce porous ceramics with reduced strength. Formulations are desired that allow for the direct conversion of preceramic polymers to dense ceramics with properties that approach the theoretical maximum strength of the base materials.

There is commercial demand for additively manufactured (3D-printed) ceramics in many fields including industrial filtration (molten metal filters, flow separators); metal processing (casting molds/blanks); implantable dental and medical devices; and semiconductor processing. Additive manufacturing of ceramic materials is also of interest for propulsion components, thermal protection systems, porous burners, microelectromechanical systems, and electronic device packaging, for example.

SUMMARY OF THE INVENTION

Some variations provide a preceramic radiation-curable resin composition comprising a molecule having the formula:

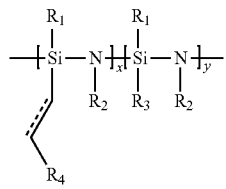

wherein:
x=1 to 100 when repeat units are connected linearly or x=1 to 10 when repeat units are connected cyclically;
y=0 to 100 when repeat units are connected linearly (or when there are no such repeat units present) or y=0 to 10 when repeat units are connected cyclically;
$R_1$ is selected from the group consisting of hydrogen, a $C_1$-$C_{18}$ unsubstituted or substituted group (including saturated or unsaturated groups), a halide, an ester group, an amine group, a hydroxyl group, a cyano group, and combinations thereof;
$R_2$ is selected from the group consisting of hydrogen, a $C_1$-$C_{18}$ unsubstituted or substituted group (including saturated or unsaturated groups), a halide, an ester group, an amine group, a hydroxyl group, a cyano group, and combinations thereof;
$R_3$ is selected from the group consisting of hydrogen, a $C_1$-$C_{18}$ unsubstituted or substituted group (including saturated or unsaturated groups), a halide, an ester group, an amine group, a hydroxyl group, a cyano group, and combinations thereof;
$R_4$ is a UV-active functional group that is capable of free-radical polymerization, cationic polymerization, or both of these; and
the carbon-carbon bond between $R_4$ and Si, depicted as ====, is a single bond (C—C) or a double bond (C=C).

In some embodiments, $R_4$ is selected from the group consisting of acrylate, methacrylate, vinyl ether, epoxide, cycloaliphatic epoxide, oxetane, thiol, alkyne, and combinations, analogues, or derivatives thereof that maintain UV activity. In certain embodiments when $R_4$ is a thiol, the composition further contains an additional molecule comprising two or more unsaturated C=X double bonds, two or more C≡X triple bonds, or at least one C=X double bond and at least one C≡X triple bond, wherein X is selected from C, S, O, N, or combinations thereof.

When y>0, the x repeat units and they repeat units may be arranged in a block copolymer, a segmented copolymer, a random copolymer, or an alternating copolymer, for example. In some embodiments, the x repeat units and they repeat units are arranged randomly. For example, if the hydrosilylation reaction occurs at random repeat units of the starting molecule, the final polymer will be a random copolymer. If the repeat units of the starting first molecule all contain Si—H groups (i.e., $R_3$=H) and the hydrosilylation reaction completely converts all Si—H groups to the hydrosilylation reaction product, then y=0.

The composition further may comprise a photoinitiator that is effective to initiate polymerization at the UV-active functional group. The photoinitiator may be present in a concentration from about 0.001 wt % to about 10 wt % in the composition. The photoinitiator may be selected from the group consisting of 2,2-dimethoxy-2-phenylacetophenone, 2-hydroxy-2-methylpropiophenone, camphorquinone, bis(2, 4,6-trimethylbenzoyl)-phenylphosphineoxide, benzophenone, benzoyl peroxide, and combinations thereof, for example.

In some embodiments, the photoinitiator generates free radicals from the molecule under exposure to light with a wavelength from about 200 nm to about 500 nm for free-radical polymerization of the first molecule. In some embodiments, the photoinitiator is a photoacid generator that cleaves to form a Brønsted acid for cationic polymerization of the first molecule.

The composition further may comprise a radiation-trigger free-radical initiator active at a second wavelength that is substantially different from a first wavelength for which the photoinitiator is active. In some embodiments, the composition further comprises a UV sensitizer that is capable of reactive energy transfer to the photoinitiator.

The composition further may comprise a thermal free-radical initiator selected from the group consisting of benzoyl peroxide, dicumyl peroxide, 2,2'-azobisisobutyronitrile, platinum-carbonyl-cyclovinylmethylsiloxane complex, platinum-divinyltetramethyldisiloxane complex, and combinations thereof.

The composition further may comprise a free-radical inhibitor. For example, the free-radical inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, N-nitroso-N-phenylhydroxylamine aluminum salt, and combinations thereof. The free-radical inhibitor, when present, may be at a concentration from about 0.001 wt % to about 10 wt % in the composition.

The composition further may comprise a 3D-printing resolution agent selected from the group consisting of UV absorbers, fluorescent molecules, optical brighteners, and combinations thereof. In some embodiments, the 3D-printing resolution agent is selected from the group consisting of 2-(2-hydroxyphenyl)-benzotriazole, 2-hydroxyphenyl-benzophenones, 2-hydroxyphenyl-s-triazines, 2,2'-(2,5-thiophenediyl)bis(5-tert-butylbenzoxazole), 2,2'-(1,2-ethenediyl)bis(4,1-phenylene)bisbenzoxazole, and combinations thereof. The 3D-printing resolution agent, when present, may be at a concentration from about 0.001 wt % to about 10 wt % in the composition.

Optionally, the composition further comprises from about 0.1 vol % to about 70 vol % of solid-phase fillers.

Other variations of the invention provide a preceramic resin precursor formulation comprising:
(a) a first material containing first molecules comprising at least one Si—C bond, at least one Si—N bond, or at least one Si—C bond and at least one Si—N bond, wherein at least one of the first molecules comprise at least one repeat unit with a silyl hydride group (Si—H) available for hydrosilylation; and (b) a second material containing second molecules with at least one unsaturated carbon-carbon double bond attached to an $R_4$ group ($R_4$—C=C), and/or at least one carbon-carbon triple bond attached an $R_4$ group ($R_4$—C≡C), wherein $R_4$ is a UV-active functional group.

In some embodiments, the first molecules contain side groups selected from the group consisting of hydrogen, halides, substituted or unsubstituted cyclic or acyclic alkyl groups, aryl groups, hydrocarbon groups containing C=X double bonds or C≡X triple bonds (X is C, S, O, and/or N), and combinations thereof. For example, the first molecules may contain side groups selected from the group consisting of vinyl, ethynyl, vinyl ether, vinyl ester, vinyl amides, vinyl triazine, vinyl isocyanurate, acrylate, methacrylate, diene, triene, and combinations thereof.

The first molecules further may contain one or more atoms selected from the group consisting of B, Al, Ti, Zn, Zr, O, N, P, S, Ge, and combinations thereof.

In some embodiments, at least 10 wt % of the first molecules is inorganic. In some embodiments, at least 10 wt % of the first molecules is Si.

The first molecules may be selected from the group consisting of trivinylborazine; 2,4,6-trimethyl-2,4,6-trivinylcyclotrisilazane; 1,3,5,7-tetravinyl-1,3,5,7-tetramethyl-cyclotetrasilazane; B,B',B"-triethynyl-N,N',N"-trimethylborazine; B,B',B"-triethynylborazine; 1,2,3,4,5,6-hexamethylcyclotrisilazane; 1,1,3,3,5,5-hexamethylcyclotrisilazane; 1,2-dimethylsilazane; 1,1-perhydrosilazane; 1,3-divinyl-1,3-diphenyl-1,3-dimethyldisilazane; 1,3-divinyl-1,1,3,3-tetramethyldisilazane; 1,3,5,7-tetravinyl-1,3,5,7-tetramethyl-cyclotetrasilazane; 1,1,3,3,5,5,7,7-octamethylcyclotetrasilazane; 1,2,3,4,5,6,7,8-octamethylcyclotetrasilazane; 1,1,3,3-tetramethyldisilazane; polymethylcarbosilane; polyallylcarbosilane; derivatives of any of the foregoing in which one or more functional groups have been replaced with hydrido groups; and combinations thereof.

In certain embodiments, the first molecules have the formula:

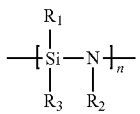

wherein:

n=1 to 100 when repeat units are connected linearly or n=2 to 10 when repeat units are connected cyclically;

$R_1$ is selected from the group consisting of hydrogen, a $C_1$-$C_{18}$ unsubstituted or substituted group, a halide, an ester group, an amine group, a hydroxyl group, a cyano group, and combinations thereof; and $R_2$ is selected from the group consisting of hydrogen, a $C_1$-$C_{18}$ unsubstituted or substituted group, a halide, an ester group, an amine group, a hydroxyl group, a cyano group, and combinations thereof; and $R_3$ is selected from the group consisting of hydrogen, a $C_1$-$C_{18}$ unsubstituted or substituted group, a halide, an ester group, an amine group, a hydroxyl group, a cyano group, and combinations thereof, with the proviso that at least one $R_3$ group is hydrogen (i.e., at least one of the repeat units contains a Si—H group).

In some embodiments, $R_4$ is selected from the group consisting of acrylate, methacrylate, vinyl ether, epoxide, cycloaliphatic epoxide, oxetane, thiol, and combinations, analogues, or derivatives thereof that maintain UV activity.

The second molecules may be selected from the group consisting of allyl methacrylate, allyl acrylate, vinyl acrylate, vinyl methacrylate, allyl mercaptan, 3,4-epoxy-1-butene, 4-vinyl-1-cyclohexene 1,2-epoxide, 1,2-epoxy-5-hexene, 2-methyl-2-vinyl-oxetane, and combinations thereof.

The formulation further may comprise a homogeneous or heterogeneous metal-containing catalyst. For example, a metal-containing catalyst may contain a transition metal, e.g. Pt, Pd, Ru, Rh, Ni, Co, or a combination thereof. The metal-containing catalyst, when present, may be at a concentration from about 0.00001 wt % to about 5 wt % in the formulation.

In some embodiments, the transition metal is complexed with a ligand selected from the group consisting of halides, alkyl groups, aryl groups, aliphatically unsaturated groups, organosilicon groups, carbon monoxide, and combinations thereof.

In some embodiments, the metal-containing catalyst is a heterogeneous metal-containing catalyst, wherein the transition metal is disposed on a support material selected from the group consisting of silica, alumina, silicates, aluminosilicates, zeolites, carbon, and combinations thereof.

In some embodiments, the metal-containing catalyst is a homogeneous metal-containing catalyst, wherein the transition metal is dissolved or suspended in a solvent selected from the group consisting of hexane, furan, tetrahydrofuran, 2-methyltetrahydrofuran, methylpyrrolidine, and combinations thereof.

The metal-containing catalyst may be selected from the group consisting of chloroplatinic acid hydrate, platinum (0)-1,3-divinyl-1,1,3,3-tetramethyldisiloxane complex solution, tris(triphenylphosphine)rhodium(I) chloride, benzylidenebis(tricyclohexylphosphine)dichloro-ruthenium(II), dichloro(1,5-cyclooctadiene)platinum(II), platinum(II) acetylacetonate, and combinations thereof.

The formulation further may comprise an aprotic organic solvent in a concentration from about 1 wt % to about 99 wt % in the formulation. The aprotic organic solvent may be selected from the group consisting of hexane, cyclohexane, toluene, diethyl ether, tetrahydrofuran, 2-methyltetrahydrofuran, pyridine, n-methylpyrrolidine, chloroform, and combinations thereof, for example.

The formulation further may comprise an inhibitor (e.g., a polymerization inhibitor) in a concentration from about 0.001 wt % to about 10 wt % in the formulation. The inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, 1,3-divinyltetramethyldisiloxane, 1,3,5,7-tetravinyl-1,3,5,7-tetra-methylcyclotetrasiloxane, N-nitroso-N-phenylhydroxylamine aluminum salt, and combinations thereof.

Other variations of the invention provide a method of making a preceramic radiation-curable resin composition, the method comprising:

(a) obtaining a first material containing first molecules comprising at least one Si—C bond, at least one Si—N bond, or at least one Si—C bond and at least one Si—N bond, wherein at least one of the first molecules includes at least one silyl hydride group (Si—H) available for hydrosilylation;

(b) obtaining a second material containing second molecules with at least one unsaturated carbon-carbon double bond attached to an $R_4$ group ($R_4$—C=C), and/or at least one carbon-carbon triple bond attached an $R_4$ group ($R_4$—C≡C), wherein $R_4$ is a UV-active functional group; and (c) reacting, via hydrosilylation in the presence of a homogeneous or heterogeneous metal-containing catalyst, the first material with the second material, to generate a third material containing third molecules comprising at least one Si—C bond, at least one Si—N bond, or at least one Si—C bond and at least one Si—N bond, wherein the third molecules further comprise a $R_4$—C—C—Si sequence and/or a $R_4$—C=C—Si sequence as a hydrosilylation reaction product.

In preferred embodiments, in step (c), the molar ratio of the second molecules to the first molecules is selected from about 1 to about n, wherein n is the average number of silyl hydride groups present in each of the first molecules.

The metal-containing catalyst may comprise a transition metal selected from the group consisting of Pt, Pd, Ru, Rh, Ni, Co, and combinations thereof. The transition metal may be complexed with a ligand selected from the group consisting of halides, alkyl groups, aryl groups, aliphatically unsaturated groups, organosilicon groups, carbon monoxide, and combinations thereof. In some methods, the metal-containing catalyst is a heterogeneous metal-containing catalyst, wherein the transition metal is disposed on a support material selected from the group consisting of silica, alumina, silicates, aluminosilicates, zeolites, carbon, and combinations thereof. In other methods, the metal-containing catalyst is a homogeneous metal-containing catalyst, wherein the transition metal is dissolved or suspended in a solvent selected from the group consisting of hexane, furan, tetrahydrofuran, 2-methyltetrahydrofuran, methylpyrrolidine, and combinations thereof.

The metal-containing catalyst may be selected from the group consisting of chloroplatinic acid hydrate, platinum (0)-1,3-divinyl-1,1,3,3-tetramethyldisiloxane complex solution, tris(triphenylphosphine)rhodium(I) chloride, benzylidenebis(tricyclohexylphosphine)dichloro-ruthenium(II), dichloro(1,5-cyclooctadiene)platinum(II), platinum(II) acetylacetonate, and combinations thereof.

Step (c) may be conducted in the presence of an aprotic organic solvent. Step (c) may be conducted in the presence of a polymerization inhibitor.

In some embodiments, step (c) is conducted in an inert atmosphere. The reaction temperature for step (c) may vary, such as from about 10° C. to about 125° C. The reaction time for step (c) may vary, such as from about 10 minutes to about 48 hours.

The method further may comprise purifying the third material, such as with a technique selected from the group consisting of solvent/solvent extraction, evaporation, distillation, vacuum distillation, chromatography, filtration, centrifugation, and combinations thereof.

The third material may be combined with a catalyst quencher to capture or poison the metal-containing catalyst. The weight ratio of the catalyst quencher to the active metal in the metal-containing catalyst may be from about 0.001 to about 10, for example. In some embodiments, the catalyst quencher is selected from the group consisting of activated carbon, dimethyl maleate, dimethyl fumarate, benzothiazole, triphenylphosphine, and combinations thereof.

In certain methods, the first molecules have the formula:

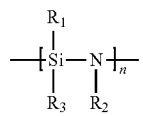

and the third molecules have the formula:

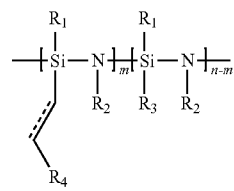

wherein:
m=1 to 100 and is the number of the second molecules that react with each of the first molecules;
n=1 to 100 when repeat units of the first molecules are connected linearly or n=2 to 10 when repeat units of the first molecules are connected cyclically;
n−m=0 or greater (e.g., 0.1, 0.5, 1, or greater);
$R_1$ is selected from the group consisting of hydrogen, a $C_1$-$C_{18}$ unsubstituted or substituted group, a halide, an ester group, an amine group, a hydroxyl group, a cyano group, and combinations thereof;
$R_2$ is selected from the group consisting of hydrogen, a $C_1$-$C_{18}$ unsubstituted or substituted group, a halide, an ester group, an amine group, a hydroxyl group, a cyano group, and combinations thereof;
$R_3$ is selected from the group consisting of hydrogen, a $C_1$-$C_{18}$ unsubstituted or substituted group, a halide, an ester group, an amine group, a hydroxyl group, a cyano group, and combinations thereof;
$R_4$ is a UV-active functional group, such as (but not limited to) acrylate, methacrylate, vinyl ether, epoxide, cycloaliphatic epoxide, oxetane, thiol, or combinations, analogues, or derivatives thereof; and
the carbon-carbon bond between $R_4$ and Si, depicted as ==== is a single bond (C—C) or a double bond (C=C).

The method further may include 3D printing and thermally treating the preceramic radiation-curable resin composition to generate a ceramic material.

DETAILED DESCRIPTION OF EMBODIMENTS OF THE INVENTION

The compositions, formulations, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This disclosure describes resin formulations, compositions, and methods for 3D printing of preceramic polymer parts that are then fired or pyrolyzed to produce a ceramic part. Ceramic materials are prepared from a starting preceramic monomer/oligomer formulation that can be used in a UV-cure-based, direct, free-form 3D printing to form polymer composite parts, which may then be directly converted to the ceramic material. Electromagnetic-radiation curability of the resin formulations enables definition of three-dimensional shapes via 3D printing.

This disclosure also describes the production of 3D-printed ceramic parts. The 3D-printed ceramic material is prepared directly from 3D-printed preceramic polymer material, which is prepared from preceramic monomer formulations. The 3D printing may be done though stereolithography, UV (or other electromagnetic radiation) curing, laser rastering, digital light processing, liquid crystal device projection, or other techniques. Final ceramic materials include, but are not limited to, silicon oxycarbo nitride (SiONC), silicon carbide (SiC), silicon nitride ($Si_3N_4$), silicon oxynitride (SiON), silicon carbonitride (SiCN), silicon boronitride (SiBN), silicon boron carbonitride (SiBCN), for example.

The invention in various embodiments applies to additively manufactured components, such as to reduce part count, scrap, or non-recurring engineering. Some embodiments apply to high-wear or high-temperature applications that would necessitate ceramic materials. Specific applications of interest include, for example, propulsion structures (vanes, impellors, nacelles, and thrusters), control surfaces (fins and leading edges), hypersonic structures (thermal protection systems and heat shields), high-wear components (brakes, clutches, and rotors), catalyst support structures, pump components, filters, brakes, and clutches.

In particular, disclosed compositions include a hydrosilylation-modified polysilazane which adds UV functionality to the polysilazane precursor. The UV functionality may include, but is not limited to, acrylate, methacrylate, epoxide, or thiol functionalities. Polysilazane precursors may include linear or cyclic molecules and may have a secondary functionality, such as a vinyl group for thermal crosslinking, or complimentary UV functionality, such as unsaturated bonds for thiol-ene crosslinking. As disclosed in detailed herein, vinyl or allyl addition to the polysilazane, via hydrosilylation, adds a side group to the polysilazane chain. A vinyl or allyl group is bonded to a UV-active functional group.

As used herein, "hydrosilylation" means the addition of Si—H bonds across unsaturated bonds, such as unsaturated carbon-carbon bonds. The hydrosilylation reaction may be catalyzed or uncatalyzed. Typically, the hydrosilylation reaction is conducted catalytically and the substrates are unsaturated organic compounds. Alkenes and alkynes give alkyl silanes and vinyl silanes, respectively; aldehydes and ketones give silyl ethers.

"Preceramic" in this disclosure refers to the capability to be ultimately converted to a ceramic material. A "preceramic composition" is a composition that can be converted into a ceramic material, either directly (e.g., by pyrolysis) or via multiple steps (e.g., by polymerization followed by pyrolysis). In particular, a preceramic composition may contain a preceramic polymer that can be pyrolyzed into a ceramic material, a resin that can be polymerized into a preceramic polymer, or both of these.

A "preceramic polymer" is characterized in that at least some of the polymer converts to a ceramic material when heated to a temperature above 200° C. at atmospheric pressure in a substantially inert gas environment. Preferably, at least 50 wt %, more preferably at least 90 wt %, and most preferably at least 99 wt % (e.g., essentially all) of the polymer converts to a ceramic material when heated to a temperature above 200° C. at atmospheric pressure in a substantially inert gas environment.

As intended herein, a "resin" means a composition capable of being polymerized or cured, further polymerized or cured, or crosslinked. Resins may include monomers, oligomers, prepolymers, or mixtures thereof. As used herein, "polymer resin" means monomer, oligomer, prepolymer, or other molecule that is converted to a polymer.

"Radiation-curable" in this disclosure is synonymous with "electromagnetic radiation-curable." All references to "UV," "UV-curable," "UV-cure-based" and the like shall include reference not only to ultraviolet radiation but also other electromagnetic radiation bands that can be effective in various embodiments, including microwave radiation, terahertz radiation, infrared radiation, visible radiation (light), ultraviolet radiation, and X-rays. The radiation-curable liquid composition may be a UV-curable inorganic or organic composition, for example.

As used herein, a "UV-active functional group" is a chemical group in the form of multiple atoms bonded together in a functional group that has absorption in the UV or visible region of electromagnetic radiation (wavelengths from about 100 nm to about 700 nm). Absorption (UV activity) occurs when a UV-active molecule absorbs ultraviolet or visible light that excites valence electrons, causing an electronic transition from a ground state to an excited state. UV absorption can be measured by a UV-visible spectrophotometer, which provides a spectrum of absorption versus wavelength.

In some variations, a preceramic resin precursor formulation comprises:
  (a) a first material containing first molecules comprising at least one Si—C bond, at least one Si—N bond, or at least one Si—C bond and at least one Si—N bond, wherein at least one of the first molecules comprises a repeat unit with a silyl hydride group (Si—H) available for hydrosilylation; and
  (b) a second material containing second molecules with at least one unsaturated carbon-carbon double bond attached to an $R_4$ group ($R_4$—C=C), and/or at least one carbon-carbon triple bond attached an $R_4$ group ($R_4$—C≡C), wherein $R_4$ is a UV-active functional group.

The Si—N and/or Si—C bonds are contained in backbone repeat units of a silazane (monomer), a polysilazane (oligomer or polymer), a carbosilane (monomer), and/or a polycarbosilane (oligomer or polymer). When the first molecules contain at least one Si—N bond, with or without Si—C bonds also present, the first molecules are referred to herein as silazanes (when monomers) or polysilazanes (when oligomers or polymers). When the first molecules contain Si—C bonds but no Si—N bonds, they are referred to herein as carbosilanes (when monomers) or polycarbosilanes (when oligomers or polymers).

The first molecule must contain at least one Si—H (silylhydride) group, available for hydrosilylation. When the first molecule is a polymer with n repeat units, at least one of the repeat units must contain a Si—H group, but the other repeat units do not need to contain a Si—H group. Multiple Si—H groups may be present in the same repeat units, in some embodiments. When there are n repeat units within a polymeric first molecule (n>1), the number of Si—H groups may be as low as 1 (a single Si—H group within the entire polymer) and as high as 2n when all functional groups bonded with Si in the first molecule are hydrogen. In this disclosure, the $R_3$ group that is bonded to Si is hydrogen, for at least one repeat unit. Of the overall molecule, the percentage of $R_3$ groups that is H may be 100%, about 90%, about 80%, about 70%, about 60%, about 50%, about 40%, about 30%, about 20%, about 10%, or about 5%, for example.

Also, the first molecule may be a copolymer that contains a silazane and/or a carbosilane as well as another type of polymer. In these cases, the portion of copolymer that is a silazane and/or a carbosilane contains at least one repeat unit containing a Si—H group, and may contain a higher concentration of Si—H groups as described above for homopolymers of silazanes and/or a carbosilanes. The other type of polymer may itself be a silazane and/or a carbosilane, but one that does not necessarily contain a Si—H group.

In addition to the $R_3$ groups, the first molecules may contain side groups or chains, $R_1$ bonded to the Si atoms and $R_2$ bonded to the N or C atoms of the silazane or carbosilane molecules, respectively. $R_1$ and $R_2$ may be selected from, but are not limited to, hydrogen or organic or inorganic side chains or functional groups, e.g. halides, substituted or unsubstituted $C_1$-$C_{18}$ groups, cyclic or acyclic alkyl groups, aryl groups, hydrocarbon groups containing unsaturated C=X double bonds or C≡X triple bonds (X is C, S, O, and/or N). Exemplary functional groups include vinyl, ethynyl, vinyl ether, vinyl ester, vinyl amides, vinyl triazine, vinyl isocyanurate, acrylate, methacrylate, diene, triene, or a combination thereof.

Substitution on any unsaturated bonds of the first molecules may include any atoms, such as H, F, Cl, Br, or functional groups such as alkyl groups, esters, amine groups, hydroxyl groups, or cyano groups. The first molecules may contain combinations of different unsaturated bonds. Common unsaturated bonds are C=C double bonds at the terminal position of the molecules. For example, three substitutions on the C=C bonds may be hydrogen atoms.

The first molecules may also contain additional atoms in the main chain (i.e., as $R_1$ or $R_2$ themselves) or in side chains (i.e., chemically contained within $R_1$ or $R_2$). Examples of other atoms include, but are not limited to, B, Al, Ti, Zn, Zr, O, N, P, S, and/or Ge. The non-carbon atoms may be a part of cyclic or acyclic groups or structures.

Exemplary first molecules include, but are not limited to, trivinylborazine; 2,4,6-trimethyl-2,4,6-trivinylcyclotrisilazane; 1,3,5,7-tetravinyl-1,3,5,7-tetramethylcyclotetrasilazane; B,B',B"-triethynyl-N,N',N"-trimethylborazine; B,B',B"-triethynylborazine; 1,2,3,4,5,6-hexamethylcyclotrisilazane; 1,1,3,3,5,5-hexamethylcyclotrisilazane; 1,2-dimethylsilazane; 1,1-perhydrosilazane; 1,3-divinyl-1,3-diphenyl-1,3-dimethyldisilazane; 1,3-divinyl-1,1,3,3-tetramethyldisilazane; 1,3,5,7-tetravinyl-1,3,5,7-tetramethylcyclotetrasilazane; 1,1,3,3,5,5,7,7-octamethylcyclotetrasilazane; 1,2,3,4,5,6,7,8-octamethylcyclotetrasilazane; 1,1,3,3-tetramethyldisilazane; polymethylcarbosilane; polyallylcarbosilane; derivatives of any of the foregoing in which one or more functional groups have been replaced with hydrido groups; and combinations thereof.

The first molecules are present at a concentration from about 1 wt % to about 99 wt % of the preceramic resin precursor formulation. In various embodiments, the first molecules are present at a concentration of about 2, 5, 10, 15, 20, 25, 30, 40, 50, 60, 70, 80, 90, 95, or 98 wt %, including all intervening ranges.

The second molecules contain a UV-active functional group, $R_4$. The UV-active functional group may be selected from, but not limited to, acrylate, methacrylate, vinyl ether, epoxy, oxetane, thiol, alkyne, or a combination thereof. Exemplary second molecules include allyl methacrylate, allyl acrylate, vinyl acrylate, vinyl methacrylate, allyl mercaptan, 3,4-epoxy-1-butene, 4-vinyl-1-cyclohexene, 1,2-epoxide, 1,2-epoxy-5-hexene, 2-methyl-2-vinyl-oxetane, or a combination thereof.

The second molecules are present at a concentration from about 1 wt % to about 99 wt % of the preceramic resin precursor formulation. In various embodiments, the second molecules are present at a concentration of about 2, 5, 10, 15, 20, 25, 30, 40, 50, 60, 70, 80, 90, 95, or 98 wt %, including all intervening ranges.

The sum of first molecules and second molecules may form a concentration from about 2 wt % to about 99.9 wt % of the preceramic resin precursor formulation. In various embodiments, the first and second molecules, taken together, are present at a concentration of about 5, 10, 15, 20, 25, 30, 40, 50, 60, 70, 80, 90, 95, or 99 wt %, including all intervening ranges.

The weight ratio of the second molecules to the first molecules may vary from about 0.1 to about 32, such as about 0.5, 1, 2, 3, 5, 10, 15, 20, 25, or 30. In some embodiments, the weight ratio of second molecules to first molecules is dependent on the ratio of thiol to vinyl. For example, in certain embodiments there is at least one thiol functional group per vinyl group.

In preferred formulations, the molar ratio of the second molecules to the first molecules is selected from about 1 to about n, wherein n is the average number of silyl hydride groups present in the first molecules, i.e., the number of individual Si—H bonds within the entire polymer chain. When the molar ratio of the second molecules to the first molecules is equal to 1, there is an average of only one second molecule for each first molecule. When the molar ratio of the second molecules to the first molecules is equal to n, there is an average of one second molecule for each repeat unit of the polymer chain of the first molecule. As an example, when n=100 and the molar ratio of the second molecules to the first molecules is equal to n, then 100 second molecules react with each first molecule. In this case, if each repeat unit of the first molecule contains one Si—H group, then one second molecule reacts with each repeat unit of the first molecule.

In certain embodiments, there is an excess of second molecules in the reaction pot, so that a mixture may be provided in which the molar ratio of the second molecules to the first molecules is larger than n, such as 2n, 3n, or more. In other certain (less-preferred) embodiments, there is less than one hydrosilylation reaction of second molecules per first molecule, in which case the molar ratio of the second molecules to the first molecules is less than 1, such as 0.5, 0.1, or less.

As stated above, hydrosilylation is typically catalyzed. Therefore, in preferred embodiments, a metal-containing catalyst is present in the preceramic resin precursor formulation, or added at a later time to carry out the desired reaction.

The metal-containing catalyst may be a homogeneous catalyst, wherein the catalyst is soluble or suspended in a liquid solution of reactants. The metal-containing catalyst may be dissolved or suspended in a solvent, such as hexane, cyclohexane, toluene, furan, tetrahydrofuran, methyltetrahydrofuran, methylpyrrolidine, pyridine, chloroform, or a combination thereof.

The metal-containing catalyst may be a heterogeneous catalyst, wherein the catalyst is in a different phase than the reactants. Typically, a heterogeneous catalyst is in a solid phase and reactants are in a liquid or vapor phase. Heterogeneous catalysts may be supported on a catalyst support, such as silica, alumina, silicates, aluminosilicates, zeolites, or carbon, for example. Mesoporous silica in the form of MCM-41 or SBA-15 may be used, in certain embodiments.

Metal-containing catalysts (whether homogeneous or heterogeneous) may include metal complexes of the form M-L, wherein M is selected from the transition metals (e.g., Pt, Pd, Ru, Rh, Ni, and/or Co), and wherein L is a ligand selected from halides, alkyl groups, aryl groups, aliphatically unsaturated groups, organosilicon groups, carbon monoxide, or a combination thereof.

Exemplary metal-containing catalysts include, but are not limited to, chloroplatinic acid hydrate (Speier's catalyst), platinum(0)-1,3-divinyl-1,1,3,3-tetramethyldisiloxane complex solution (Karstedt's catalyst), benzylidenebis(tricyclohexylphosphine)dichloro-ruthenium(II), tris(triphenylphosphine)rhodium(I) chloride, dichloro(1,5-cyclooctadiene)platinum(II), platinum(II) acetylacetonate, platinum supported on silica, platinum supported on alumina, platinum supported on activated carbon, Pt/MCM-41, Pt/SBA-15, or a combination thereof.

The metal-containing catalyst may be present from about 0.00001% (0.1 ppm) to about 5% by weight of the reaction mixture (the preceramic resin precursor formulation). In some embodiments, the preceramic resin precursor formulation contains no catalyst, such as when uncatalyzed hydrosilylation is utilized or when the catalyst will be added to the reaction mixture at a later time.

A solvent may be employed to dissolve or suspend the first and second molecules to be reacted. For example, an aprotic organic solvent may be utilized, such as (but not limited to) hexane, cyclohexane, toluene, diethyl ether, tetrahydrofuran, 2-methyltetrahydrofuran, pyridine, n-methylpyrrolidine, chloroform, or a combination thereof. The solvent may be in a concentration from 0 wt % to about 99 wt % of the preceramic resin precursor formulation. In various embodiments, the solvent is present in a concentration of about 10, 20, 30, 40, 50, 60, 70, 80, or 90 wt % of the formulation.

An inhibitor may be added in a sufficient amount to inhibit premature polymerization and/or to stabilize the formulation. Inhibitors may be free-radical inhibitors, cationic polymerization inhibitors, hydrolsilylation inhibitors, or another type of inhibitor. Inhibitors may include, but are not limited to, hydroquinones such as tert-butylhydroquinone, methylhydroquinone, ethylhydroquinone, methoxyhydroquinone, ethoxyhydroquinone, monomethylether hydroquinone, propylhydroquinone, propoxyhydroquinone, and n-butylhydroquinone. Inhibitors may alternatively, or additionally, include 1,3-divinyltetramethyldisiloxane, 1,3,5,7-tetravinyl-1,3,5,7-tetra-methylcyclotetrasiloxane, or a combination thereof. The inhibitor(s) may be in a concentration from 0 wt % to about 5 wt % of the preceramic resin precursor formulation, for example. In various embodiments, the inhibitor is present in a concentration of about 0.1, 0.5, 1, 2, 3, 4, or 5 wt % of the formulation.

In some embodiments of the invention, the second molecules are inserted into the backbone of the first molecules to create third molecules, via hydrosilylation:

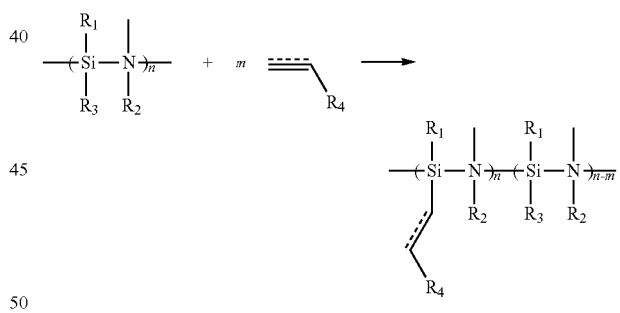

wherein:
n=1 to 100 when repeat units of the first molecules are connected linearly or n=2 to 10 when repeat units of the first molecules are connected cyclically;
m=1 to 100 and is the number of second molecules that react with each of the first molecules (m cannot be greater than n);
$R_1$ is selected from the group consisting of hydrogen, a $C_1$-$C_{18}$ unsubstituted or substituted group (including saturated or unsaturated groups), a halide, an ester group, an amine group, a hydroxyl group, a cyano group, and combinations thereof; and
$R_2$ is selected from the group consisting of hydrogen, a $C_1$-$C_{18}$ unsubstituted or substituted group (including saturated or unsaturated groups), a halide, an ester group, an amine group, a hydroxyl group, a cyano group, and combinations thereof; and $R_3$ is selected from the group consisting of hydrogen, a $C_1$-$C_{18}$ unsubstituted or substituted group (including saturated or unsaturated groups), a halide, an ester group, an amine group, a hydroxyl group, a cyano group, and combinations thereof, with the proviso that at least one $R_3$ group is hydrogen (i.e., at least one of the repeat units contains a Si—H group); and $R_4$ is a UV-active functional group.

When $R_3$=H for all repeat units and when m=n, i.e. there is stoichiometric conversion of reactants, n−m=0 and the second repeat units are not present in the product.

The unsaturated carbon-carbon bond in the second reactant (second molecules), depicted as ===, is a double bond (C=C) or a triple bond (CC). The carbon-carbon bond between $R_4$ and Si in the product (third molecules), depicted as ===, is a single bond (C—C) or a double bond (C=C). In particular, the carbon-carbon bond between $R_4$ and Si in the product is a single bond when the second molecules contain a double bond (vinyl group), and is a double bond when the second molecules contain a triple bond (alkyne group). Note that these carbon-carbon bonds may include hydrogen atoms (not explicitly shown) or other atoms in place of hydrogen, such as halogens.

The third molecules are hydrosilylation-modified silazane or carbosilane materials that include UV-active functionality via the added $R_4$ group.

Some variations therefore provide a preceramic radiation-curable resin composition comprising a molecule having the formula:

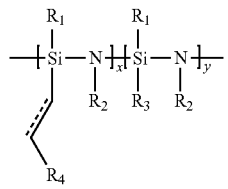

wherein:

x=1 to 100 when repeat units of the first molecules are connected linearly or x=1 to 10 when repeat units of the first molecules are connected cyclically;

y=0 to 100 when repeat units of the first molecules are connected linearly or y=0 to 10 when repeat units of the first molecules are connected cyclically;

$R_1$ is selected from the group consisting of hydrogen, a $C_1$-$C_{18}$ unsubstituted or substituted group (potentially including substitutions with $R_4$ in place of a hydrogen atom), a halide, an ester group, an amine group, a hydroxyl group, a cyano group, and combinations thereof;

$R_2$ is selected from the group consisting of hydrogen, a $C_1$-$C_{18}$ unsubstituted or substituted group, a halide, an ester group, an amine group, a hydroxyl group, a cyano group, and combinations thereof;

$R_3$ is selected from the group consisting of hydrogen, a $C_1$-$C_{18}$ unsubstituted or substituted group, a halide, an ester group, an amine group, a hydroxyl group, a cyano group, and combinations thereof;

$R_4$ is selected from the group consisting of a UV-active functional group that is capable of free-radical polymerization, cationic polymerization, or both of these; and the carbon-carbon bond between $R_4$ and Si, depicted as === is a single bond (C—C) or a double bond (C=C).

When y>0, the x repeat units and they repeat units may be arranged in a block copolymer, a segmented copolymer, a random copolymer, or an alternating copolymer, for example. In some embodiments, the x repeat units and they repeat units are arranged randomly. For example, if the hydrosilylation reaction occurs at random repeat units of the starting molecule, the final polymer will be a random copolymer.

If the hydrosilylation reaction completely converts all Si—H groups to the hydrosilylation reaction product, and all repeat units of the first molecules contained Si—H groups, then y=0. If the hydrosilylation reaction completely converts all available Si—H groups to the hydrosilylation reaction product, but less than all of the repeat units of the first molecules contained Si—H groups, then y>0 even with a perfectly stoichiometric hydrosilylation reaction.

In certain embodiments, both $R_1$ and $R_3$ are hydrogen in the first molecules (e.g., perhydropolysilazane). The hydrosilylation reaction therefore occurs at both of these sites, resulting in two —C—C—$R_4$ or —C=C—$R_4$ groups in each repeat unit. In these cases, the $R_1$ group can be considered a $C_2$ substituted (saturated or unsaturated) group in which $R_4$ is substituted into $R_1$.

In some embodiments, the preceramic radiation-curable resin composition comprises a thiol-containing monomer, oligomer, or polymer, and an additional molecule (an ene component) for UV-activated reaction. Possible ene components may include olefinic, acetylenic, allenic, aromatic, cyclopropyl, and carbon-hetero bonds. The additional molecule may include unsaturated C=X double bonds or C≡X triple bonds, wherein X is C, S, O, and/or N. Substitution on the unsaturated bonds may include any atoms such as H, F, or Cl, or groups such as alkyl groups, esters, amine groups, hydroxyl groups, or cyano groups.

The preceramic radiation-curable resin composition may contain various additional components to assist in the UV-curing chemical reactions, or for other reasons. The additional components may be added after the resin composition is formed. Alternatively, or additionally, the additional components may be introduced to the starting resin precursor formulation (the first and second molecules).

In some embodiments, the radiation-curable resin composition comprises a photoinitiator that generates free radicals under light exposure. In various embodiments, light exposure is produced from light having one or more wavelengths selected from about 200 nm to about 700 nm, such as about 250, 300, 350, 400, or 500 nm. The photoinitiator may generate free radicals under light exposure by intramolecular bond cleavage or intermolecular hydrogen abstraction, for example. Photoinitiators may be used when the polymerization is, or includes, free-radical polymerization.

For example, the photoinitiator may be selected from the group consisting of 2,2-dimethoxy-2-phenylacetophenone, 2-hydroxy-2-methylpropiophenone, camphorquinone, bis(2, 4,6-trimethylbenzoyl)-phenylphosphineoxide, benzophenone, benzoyl peroxide, thioxanones, thioxanthones, and combinations thereof. Oxygen and nitrogen dioxide may also be used as a photoinitiator. The photoinitiator, when included, may be present in a concentration from about 0.001 wt % to about 10 wt % in the composition. In various embodiments, the photoinitiator is about 0.001, 0.005, 0.01, 0.05, 0.1, 0.5, 1, 2, or 5 wt % of the composition.

A combination of different types of photoinitiators may be used in the polymerization process. More than one photoinitiator may be included to allow multi-wavelength curing.

When a photoinitiator is present, the composition may further comprise a radiation-trigger free-radical initiator active at a second wavelength that is substantially different from a first wavelength for which the photoinitiator is active.

The composition may further comprise a thermal free-radical initiator that generates free radicals under elevated temperature conditions. The addition of thermal initiator allows for multiple-mechanism curing in the formulation—i.e., both UV and thermal curing. In some embodiments, a thermal free-radical initiator (e.g., a platinum complex catalyst) catalyzes vinyl addition. For example, a thermal free-radical initiator may be used to crosslink unreacted vinyl groups remaining which have not reacted with a thiol group, or to react vinyl groups with other available functional groups such as, but not limited to, methyl or hydroxyl groups. When a thermal free-radical initiator is used, a thermal post-cure after 3D printing may be done, such as by heating the preceramic polymer structure up to 300° C.

The thermal free-radical initiator may be selected from the group consisting of benzoyl peroxide, dicumyl peroxide, 2,2'-azobisisobutyronitrile, platinum-carbonyl-cyclovinylmethylsiloxane complex, platinum-divinyltetramethyldisiloxane complex, and combinations thereof. A combination of different types of thermal free-radical initiators may be employed.

The thermal free-radical initiator, when included, may be present in a concentration from about 0.001 wt % to about 10 wt % in the composition. In various embodiments, the thermal free-radical initiator is in a concentration of about 0.001, 0.01, 0.1, 1, 2, or 5 wt % of the composition.

The composition may comprise a cationic photoinitiator or photoacid generator, such as a sulphonium, iodonium, or ferrocenium cation paired with a non-nucleophilic anion, creating an onium salt. The salt, under light exposure, creates Brønsted acids under by cleavage of the sulphonium, iodonium, and ferrocenium cation of the onium salt. Cationic photoinitiators are typically active under wavelengths from 200 nm to 350 nm. Initiators that are active at higher wavelengths are applicable.

Examples of cationic photoinitiators include, but are not limited to, sulfonium-iodonium-ferrocenium salts, cyclopentacienylcumene-iron hexafluoro phosphate, diphenyliodonium phosphate, triarylsulfonium hexafluoroantimonate, or a combination thereof.

The cationic photoinitiator, when included, may be present in a concentration from about 0.001 wt % to about 10 wt % in the composition. In various embodiments, the cationic photoinitiator is in a concentration of about 0.001, 0.01, 0.1, 1, 2, or 5 wt % of the composition. Again, a combination of cationic photoinitiators may be employed, or a combination of different types of initiators (e.g., free-radical photoinitiators, cationic photoinitiators, and/or thermal free-radical initiators).

A hydrogen donor may be used to assist in the generation of a Brønsted acid in the cation or in acceleration of anionic photoinitiator reactions, for example. Hydrogen donors may include tertiary amines, alcohols, ethers, esters, water, or a combination thereof.

UV sensitizers may be used to enable the long UV-wavelength reaction of UV systems with photoinitiators that typically absorb at lower wavelengths. This is typically the case with cationic photoinitiators, which are sometimes limited to absorption at about 355 nm. UV sensitizers interact with UV light at higher wavelengths, generally into the 400-500 nm range, and then interact with the photoinitiator to create free radicals and/or Brønsted acids. A UV sensitizer forms an excited triplet state under UV light absorption, and then, through electron or energy transfer, reacts with a photoinitiator to generate free radicals and/or Brønsted acids, thereby initiating photopolymerizaton. UV sensitizers include, but are not limited to, dibutoxyantracene, diethoxyanthracene, 1-chloro-4-propoxythioxanthone, 2-isopropylthioxanthone, 4-isopropylthioxanthone, or a combination thereof.

The UV sensitizers, when included, may be present in a concentration from about 0.001 wt % to about 5 wt % in the composition. In various embodiments, the cationic photoinitiator is in a concentration of about 0.001, 0.01, 0.1, 1, or 2 wt % of the composition.

In some embodiments, the composition further comprises a free-radical inhibitor, such as an antioxidant. A free-radical inhibitor may be added to inhibit unwanted polymerization of regions outside the desired printing area, to allow sufficient resolution to the desired part, for example. A free-radical inhibitor can also deter shadow curing, which is normally not desired. Additionally, a free-radical inhibitor can improve long-term stability of the formulation and keep reaction kinetic parameters constant over time.

Exemplary free-radical inhibitors include, but are not limited to, hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, N-nitroso-N-phenylhydroxylamine aluminum salt (or another effective salt thereof), or combinations thereof.

The free-radical inhibitor, when included, may be present in a concentration from about 0.001 wt % to about 10 wt %, typically up to about 1 wt %, in the composition. In various embodiments, the free-radical inhibitor is in a concentration of about 0.001, 0.005, 0.01, 0.05, 0.1, 0.2, 0.5, 1, or 2 wt % of the composition.

A "3D-printing resolution agent" is a compound that improves print quality and resolution by containing the curing to a desired region of the laser or light exposure. In certain embodiments, a 3D-printing resolution agent functions by absorbing light (e.g., UV or visible light) at a desired wavelength and converting the energy either into thermal energy or radiation at a higher wavelength. The use of a 3D-printing resolution agent can improve 3D-print quality and resolution by containing the curing to the region of the laser or light exposure that is the desired region laterally and/or vertically in the print bath.

The composition may comprise a 3D-printing resolution agent selected from the group consisting of UV absorbers, fluorescent molecules, optical brighteners, and combinations thereof. Exemplary 3D-printing resolution agents include, but are not limited to, 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); 2,2'-(1,2-ethenediyl)bis(4,1-phenylene)bisbenzoxazole; or a combination thereof.

When present, the 3D-printing resolution agent may be up to about 10 wt % of the composition, such as about 0.001, 0.01, 0.1, 0.5, 1, 2, 3, 4, 5, 6, 7, 8, or 9 wt % of the composition.

In certain embodiments, the composition further comprises from about 0.1 vol % to about 70 vol % of solid-phase fillers. These embodiments are discussed in more detail, below.

Other variations of the invention provide a method of making a preceramic radiation-curable resin composition, the method comprising:
(a) obtaining a first material containing first molecules comprising at least one Si—C bond, at least one Si—N bond, or at least one Si—C bond and at least one Si—N bond, wherein at least one of the first molecules comprises a repeat unit with one or more silyl hydride groups (Si—H) available for hydrosilylation;

(b) obtaining a second material containing second molecules with at least one unsaturated carbon-carbon double bond attached to an $R_4$ group ($R_4$—C=C), and/or at least one carbon-carbon triple bond attached an $R_4$ group ($R_4$—C≡C), wherein $R_4$ is a UV-active functional group; and (c) reacting, via hydrosilylation in the presence of a homogeneous or heterogeneous metal-containing catalyst, the first material with the second material, to generate a third material containing third molecules comprising at least one Si—C bond, at least one Si—N bond, or at least one Si—C bond and at least one Si—N bond, wherein the third molecules further comprise a $R_4$—C—C—Si sequence and/or a $R_4$—C=C—Si sequence as a hydrosilylation reaction product.

In steps (a) and (b), "obtaining" may mean that the first or second molecules are obtained from a commercial source, or that the first or second molecules are produced from starting components.

Note that the first and second molecules may be reacted directly following generating them or otherwise obtaining them. Alternatively, or additionally, the first and second molecules may be stored for a period of time prior to later reacting them to produce the third molecules. The first and second molecules may be separately stored (i.e., in separate containers) or may be combined and stored together, as a formulation to be later converted to a preceramic radiation-curable resin composition. The location of making or obtaining the first and/or second molecules may be the same as, or different than, the location of reacting the first and second molecules to make the third molecules.

Step (c) may be conducted at a temperature from about 10° C. to about 125° C., for about 10 minutes to about 48 hours, such as about 1-4 hours, for example. In various embodiments, step (c) may be conducted at a temperature of about 20° C., 30° C., 40° C., 50° C., 60° C., 70° C., 80° C., 90° C., 100° C., 110° C., or 120° C. In various embodiments, step (c) may be conducted for a reaction time of about 1, 2, 3, 4, 5, 10, 15, 20, 25, or 30 hours. There is generally an inverse kinetic relationship between time and temperature, such that lower temperatures require longer reaction times, and vice-versa.

In preferred methods, the molar ratio of the second molecules to the first molecules is selected from about 1 to about n, wherein n is the average number of silyl hydride groups present in the first molecules, i.e., the number of individual Si—H bonds within the entire polymer chain. When the molar ratio of the second molecules to the first molecules is equal to 1, there is an average of only one second molecule for each first molecule. When the molar ratio of the second molecules to the first molecules is equal to n, there is an average of one second molecule for each repeat unit of the polymer chain of the first molecule. As an example, when n=100 and the molar ratio of the second molecules to the first molecules is equal to n, then 100 second molecules react with each first molecule. In this case, if each repeat unit of the first molecule contains one Si—H group, then one second molecule reacts with each repeat unit of the first molecule.

In certain methods, there is an excess of second molecules in the reaction pot, so that a mixture may be provided in which the molar ratio of the second molecules to the first molecules is larger than n, such as 2n, 3n, or more. In other certain (less-preferred) methods, there is less than one hydrosilylation reaction of second molecules per first molecule, in which case the molar ratio of the second molecules to the first molecules is less than 1, such as 0.5, 0.1, or less.

Note that the first and second molecules may be reacted directly following generating them or otherwise obtaining them. Alternatively, or additionally, the first and second molecules may be stored for a period of time prior to later reacting them to produce the third molecules. The first and second molecules may be separately stored (i.e., in separate containers) or may be combined and stored together, as a formulation to be later converted to a preceramic radiation-curable resin composition. The location of making or obtaining the first and/or second molecules may be the same as, or different than, the location of reacting the first and second molecules to make the third molecules.

In some embodiments, step (c) is carried out in an inert atmosphere. For example, an inert atmosphere may be achieved and maintained using vacuum, an inert gas manifold system, or in a glove box filled with an insert gas such as helium, nitrogen, or argon.

In some embodiments, step (c) is carried out with a metal-containing catalyst. The metal-containing catalyst may be a homogeneous catalyst, wherein the catalyst is soluble or suspended in a liquid solution of reactants. The metal-containing catalyst may be dissolved or suspended in a solvent, such as hexane, cyclohexane, toluene, furan, tetrahydrofuran, methyltetrahydrofuran, methylpyrrolidine, pyridine, chloroform, or a combination thereof.

The metal-containing catalyst may be a heterogeneous catalyst, wherein the catalyst is in a different phase than the reactants. Typically, a heterogeneous catalyst is in a solid phase and reactants are in a liquid or vapor phase. Heterogeneous catalysts may be supported on a catalyst support, such as silica, alumina, silicates, aluminosilicates, zeolites, or carbon, for example. Mesoporous silica in the form of MCM-41 or SBA-15 may be used, in certain embodiments.

Metal-containing catalysts (whether homogeneous or heterogeneous) may include metal complexes of the form M-L, wherein M is selected from the transition metals (e.g., Pt, Pd, Ru, Rh, Ni, and/or Co), and wherein L is a ligand selected from halides, alkyl groups, aryl groups, aliphatically unsaturated groups, organosilicon groups, carbon monoxide, or a combination thereof.

Exemplary metal-containing catalysts include, but are not limited to, chloroplatinic acid hydrate (Speier's catalyst), platinum(0)-1,3-divinyl-1,1,3,3-tetramethyldisiloxane complex solution (Karstedt's catalyst), benzylidenebis(tricyclohexylphosphine)dichloro-ruthenium(II), tris(triphenylphosphine)rhodium(I) chloride, dichloro(1,5-cyclooctadiene)platinum(II), platinum supported on silica, platinum supported on alumina, platinum supported on activated carbon, Pt/MCM-41, Pt/SBA-15, or a combination thereof.

The metal-containing catalyst may be present from about 0.00001% (0.1 ppm) to about 5% by weight of the reaction mixture. In some embodiments, the preceramic resin precursor formulation contains no catalyst, such as when uncatalyzed hydrosilylation is utilized.

A solvent may be employed in the reaction mixture for step (c), to dissolve or suspend the first and second molecules to be reacted. For example, an aprotic organic solvent may be utilized, such as (but not limited to) hexane, cyclohexane, toluene, diethyl ether, tetrahydrofuran, 2-methyltetrahydrofuran, pyridine, n-methylpyrrolidine, chloroform, or a combination thereof. In various embodiments, the solvent is present in a concentration of about 10, 20, 30, 40, 50, 60, 70, 80, or 90 wt % of the reaction mixture.

In some embodiments, step (c) is carried out with an inhibitor present, such as to inhibit premature polymerization. Inhibitors may be free-radical inhibitors, cationic polymerization inhibitors, hydrolsilylation inhibitors, or another type of inhibitor. Inhibitors may include, but are not limited to, hydroquinones such as tert-butylhydroquinone, methylhydroquinone, ethylhydroquinone, methoxyhydroquinone, ethoxyhydroquinone, monomethylether hydroquinone, propylhydroquinone, propoxyhydroquinone, and n-butylhydroquinone. Inhibitors may alternatively, or additionally, include 1,3-divinyltetramethyldisiloxane, 1,3,5,7-tetravinyl-1,3,5,7-tetra-methylcyclotetrasiloxane, N-nitroso-N-phenylhydroxylamine aluminum salt, or a combination thereof. The inhibitor(s) may be in a concentration from 0 wt % to about 5 wt % of the reaction mixture, for example.

The "reaction conversion" is the extent of reaction of first and second molecules into third molecules, based on the stoichiometrically limiting reactant. In the case of stoichiometric amounts of both reactants (first molecules and second molecules), the reaction conversion may be based on either of the reactants. In various embodiments, the reaction conversion is at least 50%, 75%, 90%, 95%, or 99%. Preferably, the reaction conversion is at least 90%, at least 95%, or essentially 100%.

The "reaction selectivity" is the selectivity of the reaction toward the desired third molecules, versus side products. In the case of perfectly stoichiometric conversion of first molecules and second molecules into third molecules, the reaction selectivity is 100%, even if there is an excess of one of the reactants or if the reaction conversion is less than 100%. In various embodiments, the reaction selectivity is at least 50%, 75%, 90%, 95%, or 99%. Preferably, the reaction selectivity is at least 90%, at least 95%, or essentially 100%.

Reaction selectivity and reaction conversion are thus separate parameters. Reaction conversion is typically dictated by kinetic parameters such as time, temperature, and the presence of a catalyst, for example, while reaction selectivity may be influenced by the nature of the starting molecules, impurities present (if any), and the kinetics of side reactions compared to the desired main reaction. "Reaction yield" is reaction conversion x reaction selectivity. In various embodiments, the reaction yield is at least 25%, 50%, 75%, or 90%. Preferably, the reaction yield is at least 80%, at least 90%, or essentially 100%.

The reaction in step (c) is carried out in a reactor, which may be agitated or non-agitated. Agitation enhances mass and heat transfer. Step (c) may be conducted as a batch, continuous, or semi-continuous process. When the reaction is continuous or semi-continuous, the flow pattern in the reactor may be plug flow, continuously stirred, or between these extremes.

The method may further include purifying the third material, after the desired reaction conversion is achieved. Purification may include removing solvent (if used), unreacted starting molecules (if any), and residual inhibitors (if any). Purifying may be accomplished by solvent/solvent extraction, evaporation (e.g., via a rotary evaporator, or "rotovap"), distillation, vacuum distillation, chromatography, filtration (such as with activated carbon or silica gel), centrifugation, or a combination thereof. Other purification techniques may be employed to separate and recover the third material for storage or further use.

The third material may be combined with a catalyst quencher to capture or poison the metal-containing catalyst. For example, the product from the hydrosilylation is optionally treated with a catalyst quencher at room temperature, to inhibit premature curing.

The weight ratio of the catalyst quencher to the active metal in the metal-containing catalyst may be from about 0.001 to about 10, such as about 0.01, 0.1, 0.5, 1, 2, 3, or 5, for example.

In some embodiments, the catalyst quencher is selected from the group consisting of activated carbon, dimethyl maleate, dimethyl fumarate, benzothiazole, triphenylphosphine, and combinations thereof. Other molecules containing conjugated double bonds, thiazole groups, and/or phosphine groups may be employed as catalyst quenchers.

As mentioned earlier, the preceramic composition may further comprise a solid metal filler and/or a solid ceramic filler. Solid fillers may be added after the preceramic radiation-curable resin composition is produced. Alternatively, or additionally, solid fillers may be added to the starting formulation so that they remain present in the preceramic composition generated (via hydrolsilylation) from the starting formulation.

A solid ceramic filler or solid metal filler is a ceramic or metal material that (a) forms at least one solid phase at 25° C. and 1 atm, and (b) enhances at least one chemical, physical, mechanical, or electrical property within the preceramic composition or a reaction product thereof.

In some embodiments, the preceramic composition comprises a solid metal filler that has a melting temperature equal to, or greater than, the pyrolysis temperature of a polymerized variant of the liquid resin. In these or other embodiments, the preceramic composition comprises a solid metal filler that has a melting temperature less than the pyrolysis temperature of a polymerized variant of the liquid resin. The melting temperature of a solid metal filler may be about 200° C., 300° C., 400° C., 500° C., 600° C., 700° C., 800° C., 900° C., 1000° C., 1100° C., 1200° C., 1300° C., 1400° C., 1500° C., or higher, for example.

The solid ceramic or metal filler may be from about 0.1 vol % to about 70 vol % of the preceramic composition, with the majority of the remainder typically being the liquid resin and the solid polymer filler.

The geometric shape of the solid ceramic or metal filler may be fibers including short fibers (1-100 micrometers in length) or long fibers (>100 micrometers in length), whiskers, nanotubes, nanorods, flat platelets, microparticles with diameters between 1 and 100 micrometers, nanoparticles with diameters between 1 and 1000 nanometers, or a combination thereof.

In some embodiments, to increase fracture toughness of a 3D-printed part, solid ceramic or metal fillers with aspect ratios of at least 2 are preferred, such as fibers, whiskers, nanotubes, and nanorods. Here, "aspect ratio" is the ratio of average length to average width, or in the case of an arbitrary shape, the ratio of average maximum length scale to average minimum length scale. The solid ceramic or metal filler aspect ratio is preferably at least 5, more preferably at least 10, in certain embodiments.

The solid ceramic or metal filler is preferably stable at a pyrolysis temperature of at least 800° C., so as not to disintegrate, melt, or vaporize during later conversion of a preceramic polymer to a ceramic material. Note that the solid ceramic or metal filler may react at pyrolysis temperatures with other components present in the preceramic composition or its reaction products (e.g., preceramic polymer) or with furnace atmosphere gases. It is possible for a portion of the solid ceramic or metal filler to react away into the vapor phase, or into a liquid phase, during high-temperature processing.

In certain embodiments, a solid ceramic or metal filler precursor is introduced to the preceramic composition, wherein the precursor is in a liquid phase or is a gel, for example. The precursor may then react or undergo a phase change, such as during polymerization, to convert the precursor into a solid ceramic or metal filler.

The optional solid ceramic or metal filler may have a wide range of compositions. For example, solid ceramic or metal filler compositions may include, but are not limited to, silicon-based ceramics such as SiOC, $SiO_2$, SiCN, SiC, SiCBN, SiOCN, $Si_3N_4$, silicate glasses, etc. Solid ceramic or metal filler compositions may include non-silicon-based ceramics such as metal oxides, e.g. $Al_2O_3$, $ZrO_2$, $TiO_2$, or $Y_3Al_5O_{12}$. Solid ceramic or metal filler compositions may include carbide-based ceramics such as carbon, graphene, diamond, and metal carbides, e.g. TiC, ZrC, HfC, or $B_4C$. Solid ceramic or metal filler compositions may include nitride-based ceramics, e.g. BN, TiN, ZrN, AlN, or $Si_3N_4$. Solid metal filler compositions may include pure metals or metal alloys, such as (but not limited to) alkali metals, alkaline earth metals, transition metals, post-transition metals, or combinations or alloys thereof.

Solid ceramic or metal fillers in a resin interact with UV light according to Snell's law and the well-known Fresnel equations. These laws of physics determine the fractions of the light that are reflected, transmitted, or absorbed when UV light passes from resin to filler. For a UV-based 3D printing process, it is preferred that the solid fillers do not absorb too much UV light which would hinder complete UV curing of the resin.

To avoid absorption of too much UV light, a low level of solid ceramic or metal filler (if any) may be employed, such as less than 10 vol % of relatively small (e.g., 10 micron or smaller) particles. Alternatively, or additionally, a solid ceramic or metal filler that is somewhat transparent to UV light and lets UV light pass through, may be employed.

Another approach to ensure that UV light is not excessively absorbed by the filler particles is to employ solid particles with a surface that reflects UV light. For example, aluminum reflects UV light well. For maximum reflection, the surface of such particle should be smooth. Surface treatments or coatings may be applied to render the surface of filler particles reflective—such as a thin coating of aluminum or silver.

Preferred solid ceramic or metal filler materials, in some embodiments, are short fibers of alumina ($Al_2O_3$), quartz ($SiO_2$), glass, silicon nitride ($Si_3N_4$), yttrium aluminum garnet (YAG), or boron nitride (BN) because these materials transmit at least some UV light. SiC or C fibers absorb significant UV light and therefore should be coated with a reflective coating, to enable efficient 3D printing.

In some variations, active solid-phase functional additives are included. By "solid-phase functional additives" it is meant a material that (a) forms at least one solid phase at 25° C. and 1 atm, and (b) performs or enhances at least one chemical, physical, mechanical, or electrical function within the ceramic structure as it is being formed and in the final structure.

Note that the optional solid-phase functional additives are distinguished from the solid ceramic or metal fillers disclosed above. Compared to solid fillers, solid-phase functional additives actively improve the final ceramic structure through one or more changes explicitly induced by the additives during pyrolysis or other thermal treatment, as will now be described.

The solid-phase functional additives may be present from about 0.1 vol % and 70 vol % of the preceramic composition. The solid-phase functional additive geometry varies. In some embodiments, the solid-phase functional additives are small particles with average sizes (length or effective diameter) from 5 nanometers to 5 micrometers.

In some embodiments, the solid-phase functional additives actively expand in volume and counteract the shrinkage of the resin, eliminating or reducing the overall shrinkage during conversion of the polymer to ceramic.

On conversion from polymer to ceramic, typically about 20-30% linear dimensional shrinkage and about 20-60% mass loss are observed. The shrinkage facilitates cracking and distortion, and limits the achievable part size and tolerances. By introducing active solid-phase functional additives that expand in volume during pyrolysis, the shrinkage of the preceramic polymer is counteracted. The overall shrinkage during conversion of the polymer to ceramic can be reduced or even eliminated.

Note that the solid-phase functional additives are not necessarily stable (unreactive) at pyrolysis temperatures. In many case, it is desired that the functional additives are reactive.

In particular, the solid-phase functional additives may react with the preceramic composition directly on heat treatment. Alternatively, or additionally, the solid-phase functional additives may react with species (e.g., oxygen, nitrogen, or carbon) generated from decomposition of the preceramic polymer during pyrolysis.

Alternatively, or additionally, the solid-phase functional additives may react with the pyrolysis atmosphere during the pyrolysis, for example with a nitrogen, methane, or ammonia atmosphere. To counteract the detrimental effects of shrinkage, it is preferred that these reactions happen at the same time as the preceramic polymer shrinks, or are effective to reverse the volume reduction.

Examples of solid-phase functional additives for counteracting the shrinkage of the preceramic polymer include, but are not limited to, scandium, yttrium, titanium, zirconium, hafnium, vanadium, niobium, tantalum, chromium, molybdenum, tungsten, manganese, iron, cobalt, nickel, zinc, boron, aluminum, gallium, silicon, germanium, phosphorus, or combinations thereof. Combinations of these elements such as titanium silicide, chromium silicide, magnesium silicide, zirconium silicide, or molybdenum silicide may be used as the solid-phase functional additives. Preferred solid-phase functional additives in this category include aluminum, titanium, zirconium, titanium silicide, chromium silicide, magnesium silicide, and zirconium silicide.

In some embodiments, the solid-phase functional additives actively seed crystallization of a preferred ceramic phase by enabling epitaxial growth of the preferred phase without a nucleation barrier. After pyrolysis of preceramic polymers, an amorphous ceramic is usually obtained. To increase strength and hardness, and reduce high-temperature creep, the amorphous ceramic material needs to then be crystallized into a preferred ceramic phase. This is typically achieved by a long (many hours) heat treatment at temperatures above the pyrolysis temperature, performed right after the pyrolysis or as a distinct second heat treatment.

By contrast, with appropriate solid-phase functional additives, crystallization may be facilitated by seeding crystallization. Without limitation, the mechanism may include providing a surface for epitaxial growth of the preferred phase or multiple ceramic phases.

For example, the crystallization of β-SiC in an amorphous SiC or SiCN ceramic derived from a polycarbosilane-based or polysilazane-based resin can be facilitated by small (e.g., 1 nanometer to 5 microns) β-SiC crystals. Crystallization of such a resin may be performed at temperatures between 1300° C. and 2800° C. over the course of 5 to 50 hours.

Similarly, the crystallization of the α phase or β phase of $Si_3N_4$ in an amorphous $Si_3N_4$ or SiCN ceramic derived from a polysilazane-based resin can be facilitated by small (e.g., 50 nanometers to 5 microns) $β-Si_3N_4$ or $β-Si_3N_4$ crystals, respectively. Other crystals may be chosen to facilitate crystallization, with the typical constraint of epitaxial growth on one crystal facet with low lattice strain.

In the above or other embodiments, the preceramic composition may include a solid polymer filler present at a concentration from about 0.1 vol % to about 95 vol % of the preceramic composition, such as from about 1 vol % to about 70 vol % of the preceramic composition. In various embodiments, the solid polymer filler is at a concentration of about 0.5, 1, 2, 5, 10, 20, 30, 40, 50, 60, 70, 80, or 90 vol % of the preceramic composition.

The solid polymer filler may be an organic polymer, an inorganic polymer, or a combination thereof. In certain embodiments, the solid polymer filler is a silicon-based polymer. In other certain embodiments, the solid polymer filler is a boron-based polymer. Mixtures of more than one type of solid polymer filler may be present.

The solid polymer filler may be selected from the group consisting of poly(carbosilanes), poly(silazanes), poly(silsesquioxanes), poly(borosiloxanes), poly(borosilanes), poly(borosilazanes), poly(carbosiloxanes), poly(silylcarboimides), poly(silsesquicarbodiimides), polyborazines, and combination thereof. The solid polymer filler is preferably fully polymerized, but in some embodiments, some uncured monomer may be present (e.g., carbosilanes, silazanes, etc.) along with cured polymer.

When the solid polymer fillers are themselves preceramic polymers, they may be converted upon thermal treatment to various ceramic materials including, but not limited to, silicon oxycarbide (SiOC), silicon carbide (SiC), silicon nitride ($Si_3N_4$), silicon oxynitride (SiON), silicon carbonitride (SiCN), silicon boronitride (SiBN), silicon boron carbonitride (SiBCN), boron nitride (BN), silicon metal carbides, silicon metal oxides, silicon metal nitrides, graphite, diamond, or a combination thereof.

In some embodiments, the solid polymer filler is an inorganic polymer characterized by a pyrolysis temperature equal to, or greater than, the pyrolysis temperature of a polymerized variant of the liquid resin. In other embodiments, the solid polymer filler is an organic or inorganic polymer characterized by a pyrolysis temperature less than the pyrolysis temperature of a polymerized variant of the liquid resin. A "polymerized variant" of the liquid resin means the polymer obtained by polymerizing or curing the liquid resin.

The "pyrolysis temperature" of a polymer is defined herein as the minimum thermal decomposition temperature from thermogravimetric analysis of a 10-milligram sample in a nitrogen atmosphere at a 10° C./min heating rate, as described in Beyler and Hirschler, "Thermal Decomposition of Polymers" SFPE Handbook of Fire Protection Engineering 2, Section 1, Chapter 7, pages 111-131, 2002, which is hereby incorporated by reference herein. Note that the pyrolysis temperature of a polymer is a property of that polymer, similar to polymer glass-transition temperature, without reference to how the polymer is made or used.

In various embodiments, the pyrolysis temperature of the solid polymer filler is about, at least about, or at most about 100° C., 150° C., 200° C., 250° C., 300° C., 350° C., 400° C., 450° C., or 500° C.

In various embodiments, the pyrolysis temperature of the polymerized variant of the liquid resin is about, at least about, or at most about 100° C., 150° C., 200° C., 250° C., 300° C., 350° C., 400° C., 450° C., or 500° C.

When it is desired to actually pyrolyze a solid polymer filler, the polymerized liquid resin, or both of these, the preceramic composition containing the solid polymer filler should be subjected to a reaction temperature at least equal to the pyrolysis temperature of the applicable polymer, and preferably higher than its pyrolysis temperature, for some period of time.

The solid polymer filler may itself be an inorganic, cured preceramic polymer. In some of these embodiments, the solid polymer filler has the same composition as a polymerized variant of the liquid resin. In other embodiments, the solid polymer filler has a different composition than a polymerized variant of the liquid resin. Some embodiments provide a preceramic liquid resin formulation—suitable for making a first preceramic polymer—mixed with a dispersed solid phase containing a second preceramic (cured) polymer that is different than the first preceramic polymer.

The solid polymer filler may be dispersed within the composition as a slurry, an emulsion, a solid solution, or some other form of dispersion. In some embodiments, a portion of solid polymer filler is well-dispersed within the liquid resin while the remainder is non-dispersed, such as in the form of precipitated or agglomerated solid polymer filler. Preferably, at least 80 wt %, more preferably at least 90 wt %, and most preferably at least 95 wt % or at least 99 wt % (such as essentially all) of the solid polymer filler is well-dispersed within the liquid resin.

"Well-dispersed" solid polymer filler means that individual particles of solid polymer filler are uniformly (homogeneously) distributed in space within the liquid resin. Well-dispersed solid polymer filler leads to uniform shrinkage during pyrolysis. Common methods to analyze the dispersion of particles include optical microscopy, scanning electron microscopy, transmission electron microscopy, and ultraviolet-visible (UV-Vis) spectroscopy. Tyson et al., "A quantitative method for analyzing the dispersion and agglomeration of nano-particles in composite materials" *Composites Part B: Engineering* Volume 42, Issue 6, September 2011, Pages 1395-1403, is hereby incorporated by reference herein for its teachings of quantifying dispersions of particles.

Dispersion of solid polymer filler within the liquid resin may be achieved for example by a mechanical process of mixing polymer and filler, wherein shear forces are applied to the mixture. Ultrasonic mixing may also be employed. Settling of solid polymer filler particles may be minimized by optimization of particle size, adjustment to viscosity of the liquid resin, and/or control of mixing conditions such as temperature.

The particle size of the solid polymer filler may vary widely. In some embodiments, the solid polymer filler has an average particle size (e.g., diameter, effective diameter, or length) from about 1 nanometer to about 1000 microns, such as about 10, 50, 100, 200, 300, or 500 nanometers, or about 1, 10, 50, 100, 200, 300, or 500 microns. Even larger particle sizes may be used for the solid polymer filler, such as about 1, 2, 3, 4, 5 millimeters or more.

Particles sizes may generally be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd. (Worcestershire, England). Image analysis to estimate particle sizes and distributions can be done directly on photomicrographs, scanning electron micrographs, or other images. Finally, sieving is a conventional technique of separating particles by size.

The geometric shape of the solid polymer filler may vary widely. In some embodiments, the solid polymer filler is in the form of powders (i.e. fine particles), short fibers (e.g., with length of 1-100 microns), long fibers (e.g., with length of 100-1000 microns), whiskers, nanotubes, nanorods, flat platelets, or a combination thereof. A combination of filler shapes may be used to increase dispersion in the resin and modify compositional phase distribution of the 3D-printed part.

The use of solid polymer fillers that are only partially cured or in a green state enables the reaction or crosslinking between the radiation-curable liquid resin and the solid polymer filler, providing robust cured polymer parts with higher mass retention, in some embodiments.

In some embodiments, the method further comprises 3D printing and thermally treating the preceramic radiation-curable resin composition to generate a ceramic material.

The extremely high melting point of many ceramics poses a challenge to additive manufacturing to make a 3D part, as compared with metals and polymers. Ceramics cannot be cast or machined easily. By contrast, the present methods enable geometrical flexibility. As described herein, preceramic resins that are cured with ultraviolet (UV) light in a stereolithography 3D printer or through a patterned mask, for example, form 1D, 2D, or 3D polymer structures that can have complex shape and cellular architecture. These polymer structures can then be thermally converted to the corresponding 1D, 2D, or 3D ceramic part, preferably with low shrinkage, or at least uniform shrinkage.

The preceramic monomer formulations are designed to allow the ceramic structures to be formed with preferably high thermal stability (such as chemical and physical stability at temperatures greater than 1500° C.) and good mechanical strength (including stiffness, flexural strength, hardness, and/or fracture toughness).

The compositions disclosed herein may be 3D-printed using many different methods. In some variations, the compositions may be directly 3D-printed and converted to free-form ceramic matrix composite structures. A 3D-printed preceramic polymer material may be prepared directly from preceramic compositions, with no intervening steps being necessary. A 3D-printed ceramic material may then be prepared directly from the 3D-printed preceramic polymer material, with no intervening steps being necessary.

Typically, a preceramic composition is conveyed (printed) to a region of interest, such as via stereolithography, binder jetting, resin jetting with fiber placement, polyjetting, or extrusion printing, either followed by polymerization or with polymerization taking place simultaneously with the printing. Preferably, the polymerizing and 3D printing steps are performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place. In some embodiments, a preceramic resin is first polymerized, followed by 3D printing of the already-made polymer (e.g., a thermoplastic material).

In stereolithography, layers of resin composition are cured from the top or bottom using UV-laser rastering, projection micro-stereolithography, digital light projection, or liquid crystal device projection, for example. Smaller filler sizes are preferred since the filler size often limits the resolution, depending on material choice.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In binder jetting, a layer of liquid resin is jetted on selected locations and cured such as via UV light or thermally. This process is similar to conventional binder jetting methods, but instead of a binder, a preceramic composition is used. An optional solid filler may initially be spread out on a substrate or on a region of polymer based on the selected monomer, if desired. After an initial step of binder jetting, another layer is generated via resin jetting and curing. This process may be repeated many times for large parts.

In resin jetting with fiber placement, solid fillers in the form of long or short fibers are placed in the preferred location and aligned in the preferred direction. Subsequently, liquid resin is jetted in selected locations and cured. The process is repeated layer-by-layer to build a part. Resin jetting with fiber placement enables printing of parts with high volume fraction (such as 30-60 vol %) of aligned fibers, resulting in improved mechanical properties for the final ceramic structure (following pyrolysis).

In polyjetting, a mixture of liquid resin (and optionally solid fillers) is jetted and written into the desired pattern. As the mixture is dispensed, it is exposed to UV light such as a laser, LED, or plasma sources, and cured into a polymer. Multiple mixtures are able to be dispensed through different nozzles, allowing for more than one composition to be utilized simultaneously. This results in tailored mechanical properties for the final ceramic structure (following pyrolysis).

In extrusion printing, the liquid resin composition is squeezed through a micro-nozzle, or multiple micro-nozzles, and cured via UV light. One advantage is that high-aspect-ratio fillers can be aligned with the extrusion process. Alignment generally improves mechanical properties in the aligned direction.

After a part is 3D printed using any of the above methods, or another method, the part may be post-cured. An optional thermal post-cure of the 3D polymer is performed after the 3D printing but prior to the pyrolysis to produce the ceramic structure. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial 3D-printing composition, to facilitate later thermal curing.

In some embodiments, the curing or conversion of the preceramic composition to a preceramic polymer includes crosslinking. A crosslink is a bond that links one polymer chain to another. Crosslink bonds can be covalent bonds or ionic bonds. When polymer chains are linked together by crosslinks, they lose some of their ability to move as individual polymer chains. Crosslinks are the characteristic property of thermosetting plastic materials. In most cases, crosslinking is irreversible, unless ionic bonds are employed in reversible crosslinks. See, for example, commonly owned U.S. patent application Ser. No. 15/391,749, filed Dec. 27, 2016, which is hereby incorporated by reference herein, regarding reversible crosslinks.

In some embodiments, while a monomer is being converted to polymer, a gel is formed first. Gel formation is followed by formation of a solid material as the monomer conversion is further increased, to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid.

The direct, near-net-shape conversion of a preceramic 3D-printed polymer to a ceramic structure may be achieved by pyrolysis or other thermal treatment, such as (but not limited to) sintering, annealing, or calcination. Typically, the thermal treatment is based on heating the 3D-printed structure for an extended period of time (such as from 10 minutes to 1 week) under various inert or reactive atmospheres.

Thermal treatment may be done for an extended period of time under various inert or reactive atmospheres, including but not limited to $N_2$, Ar, He, air, $CO_2$, CO, $H_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1-20° C./min from ambient temperature to an elevated temperature from about 500° C. to about 2000° C., such as from about 800° C. to about 1100° C. When it is desired to convert the polymerized liquid resin into ceramic material, the selected temperature needs to at least be equal to the pyrolysis temperature of the polymerized liquid resin (a polymer property defined above), and preferably greater than such pyrolysis temperature, such as at least 50° C., 100° C., 200° C., 300° C., 400° C., or 500° C. greater than the pyrolysis temperature of the polymerized liquid resin.

When it is desired to convert the solid polymer filler also into ceramic material, the selected temperature needs to at least be equal to the pyrolysis temperature of the solid polymer filler, and preferably greater than such pyrolysis temperature, such as at least 50° C., 100° C., 200° C., 300° C., 400° C., or 500° C. greater than the pyrolysis temperature of the solid polymer filler.

Slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 950° C.) for at least 1, 5, 10, 15, 30, or 60 minutes, for example. Following pyrolysis, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

The thermal treatment is preferably performed following polymerization and any (optional) thermal post-cure of the 3D-printed polymer. In certain embodiments, the thermal treatment is combined (i.e., overlaps in time and/or temperature) with polymerization, thermal post-cure, or both. It will also be recognized that even when a sequential operation is intended, some amount of ceramic formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 2000° C. The system pressure may also be adjusted to influence the gas atmosphere.

In some embodiments, a solid polymer filler and the preceramic polymer (from polymerization of the resin composition) pyrolyze in parallel to form a cohesive ceramic structure. The ceramic microstructure may be homogenous or heterogeneous. That is, regions derived from pyrolysis of the preceramic polymer may be heterogeneous with discrete regions derived from pyrolysis of the solid polymer filler. Or, the final ceramic structure may be homogeneous, without discrete regions derived from pyrolysis of the preceramic polymer versus those derived from pyrolysis of the solid polymer filler.

Following pyrolysis or other thermal treatment, the ceramic material comprises chemically and/or physically interconnected ceramic materials such as, but not limited to, silicon oxycarbide (SiOC), silicon carbide (SiC), silicon nitride ($Si_3N_4$), silicon oxynitride (SiON), silicon oxycarbonitride (SiOCN), silicon carbonitride (SiCN), silicon boronitride (SiBN), silicon boron carbonitride (SiBCN), boron nitride (BN), and/or silicon metal carbides, oxides, or nitrides. The ceramic materials may be interconnected in a solid solution, and/or there may be chemical bonds between individual ceramic particles. There may also be an interface layer between ceramic materials. The ceramic materials may be interconnected within a three-dimensional structure.

The composition of the ceramic part or ceramic matrix composite obviously is directly dependent on the composition of the starting preceramic composition as provided in this disclosure.

In some embodiments, final ceramic structures are lightweight, strong, and stiff—but can withstand a high-temperature oxidizing environment. The configuration and microstructure of the preceramic polymer determine the composition, microstructure, and yield of the ceramic material after thermal treatment. A high crosslink density may be preferred to prevent the fragmentation and loss of low-molecular-mass species, which have not fully converted to either ceramic or escaping gases, during thermal treatment.

During the thermal treatment, whether an inert or reactive thermal treatment technique is employed, gases escape. Gases are formed during the conversion of preceramic polymer to the ceramic structure, by decomposition reactions of the polymer and other materials present. The escaping gases or vapors may include (but are by no means limited to) $CH_4$, $H_2$, CO, $CO_2$, $H_2O$, $SO_2$, $H_2S$, $CH_3S$, etc.

The final ceramic structure may be characterized by an actual density that is at least 50% of theoretical density, preferably at least 75% of theoretical density, and more preferably at least 95% of theoretical density. By "theoretical density" it is meant the density of the material itself, calculated in the absence of porous voids. For example a ceramic structure with absolute density of 2.0 g/cm$^3$, fabricated from a base material with inherent (bulk) density of 2.1 g/cm$^3$, exhibits 2.0/2.1=95% of theoretical density. In certain embodiments, without limitation, the ceramic structure is a fully dense monolith, which means that the ceramic structure has at least 99% (e.g., essentially 100%) of theoretical density associated with a part or continuous region of material (also referred to as a "monolith"). The absolute density in g/cm$^3$ will vary, depending on the selection of base materials; an exemplary range is about 1 g/cm$^3$ to about 5 g/cm$^3$.

The overall mass loss associated with the conversion of preceramic polymer to the ceramic structure may vary widely, such as from about 1 wt % to about 90 wt %, e.g. about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

Associated with mass loss may be shrinkage of the preceramic polymer as it converts to the ceramic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. In some embodiments with high mass loss, there is substantial shrinkage, unless certain solid-phase fillers are utilized as described above. These embodiments tend to produce lower porosity, or no porosity, and therefore higher densities (e.g., fully dense ceramic materials). Finally, in some embodiments, there is little mass loss but shrinkage associated with chemical reactions taking place. These embodiments also tend to produce relatively high densities.

Despite shrinkage, if any, the bulk shape (relative geometry) of the preceramic 3D-printed polymer may be preserved in the final ceramic structure. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage occurs when there is no random fragmentation during conversion of the preceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage, in certain embodiments employing active functional additives) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

The strength of the final ceramic material will vary, depending on the initial preceramic composition, as well as the processing parameters. In some embodiments, the final ceramic material is characterized by a Young's Modulus of at least about 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the final ceramic material is characterized by a hardness of at least about 10 GPa, 20 GPa, 30 GPa, or more, measured at 25° C.

The thermal stability of the final ceramic material will vary, depending primarily on the initial preceramic resin formulation, as well as the processing parameters. In various embodiments, the final ceramic material is thermally stable at a temperature of at least 1500° C., 1600° C., 1700° C., 1800° C., 1900° C., or 2000° C. Thermal stability means at least that the ceramic material does melt at these temperatures, and preferably also that the ceramic material does not react (e.g., by oxidation or reduction), undergo thermal shock, or physically decompose (introducing defects) at these temperatures. In some embodiments, for example, the ceramic structure is characterized by being stable in the presence of air at a temperature of about 1000° C., 1100° C., 1200° C., 1300° C., 1400° C., 1500° C., 1600° C., 1700° C., 1800° C., or higher.

Multiple ceramic structures may be obtained and then joined, using methods such as, but not limited to, those described in commonly owned U.S. patent application Ser. No. 15/840,146, filed on Dec. 13, 2017, which is hereby incorporated by reference.

The final ceramic structure, even when no machining, polishing, bonding, surface finishing, or assembly is required, may be subjected to coloring (e.g., with inks or dyes), stamping, or other non-functional features, if desired.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

This specification hereby incorporates by reference Eckel et al., "Additive manufacturing of polymer-derived ceramics" Science, volume 351, issue 6268, pages 58-62, January 2016.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A preceramic radiation-curable resin composition comprising a metal-containing hydrosilylation catalyst and a molecule having the formula:

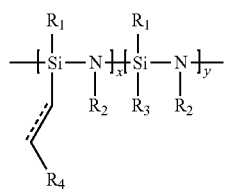

wherein:
- x=1 to 100 when repeat units are connected linearly or x=1 to 10 when repeat units are connected cyclically;
- y=0 to 100 when repeat units are connected linearly or are not present, or y=0 to 10 when repeat units are connected cyclically or are not present;
- $R_1$ is selected from the group consisting of hydrogen, a $C_1$-$C_{18}$ unsubstituted or substituted group, a halide, an ester group, an amine group, a hydroxyl group, a cyano group, and combinations thereof;
- $R_2$ is selected from the group consisting of hydrogen, a $C_1$-$C_{18}$ unsubstituted or substituted group, a halide, an ester group, an amine group, a hydroxyl group, a cyano group, and combinations thereof;
- $R_3$ is selected from the group consisting of hydrogen, a $C_1$-$C_{18}$ unsubstituted or substituted group, a halide, an ester group, an amine group, a hydroxyl group, a cyano group, and combinations thereof;
- $R_4$ is a UV-active functional group that is capable of free-radical polymerization, cationic polymerization, or both of these; and
- the carbon-carbon bond between $R_4$ and Si, depicted as ====, is a single bond (C—C) or a double bond (C=C).

2. The composition of claim 1, wherein $R_4$ is selected from the group consisting of acrylate, methacrylate, vinyl ether, epoxide, cycloaliphatic epoxide, oxetane, thiol, alkyne, and combinations, analogues, or derivatives thereof.

3. The composition of claim 2, wherein $R_4$ is a thiol, said composition further comprising an additional molecule comprising two or more unsaturated C=X double bonds, two or more C≡X triple bonds, or at least one C=X double bond and at least one C≡X triple bond, wherein X is selected from C, S, O, N, or combinations thereof.

4. The composition of claim 1, said composition further comprising a photoinitiator that is effective to initiate polymerization at said UV-active functional group.

5. The composition of claim 4, said composition further comprising a radiation-trigger free-radical initiator active at a second wavelength that is substantially different from a first wavelength for which said photoinitiator is active.

6. The composition of claim 1, said composition further comprising a free-radical inhibitor.

7. The composition of claim 1, said composition further comprising a 3D-printing resolution agent selected from the group consisting of UV absorbers, fluorescent molecules, optical brighteners, and combinations thereof.

8. The composition of claim 1, said composition further comprising from about 0.1 vol % to about 70 vol % of solid-phase fillers.

9. A preceramic resin precursor formulation comprising:
(a) a first material containing first molecules comprising at least one Si—C bond, at least one Si—N bond, or at least one Si—C bond and at least one Si—N bond, wherein at least one of said first molecules comprises a silyl hydride group (Si—H) available for hydrosilylation;
(b) a second material containing second molecules with at least one unsaturated carbon-carbon double bond attached to an $R_4$ group ($R_4$—C=C), and/or at least one carbon-carbon triple bond attached an $R_4$ group ($R_4$—C≡C), wherein $R_4$ is a UV-active functional group; and
(c) a homogeneous or heterogeneous metal-containing catalyst.

10. The formulation of claim 9, wherein said first molecules contain side groups selected from the group consisting of hydrogen, halides, substituted or unsubstituted cyclic or acyclic alkyl groups, aryl groups, hydrocarbon groups containing C=X double bonds or C≡X triple bonds (X is C, S, O, and/or N), and combinations thereof.

11. The formulation of claim 9, wherein said first molecules further contain one or more atoms selected from the group consisting of B, Al, Ti, Zn, Zr, O, N, P, S, Ge, and combinations thereof.

12. The formulation of claim 9, wherein said first molecules have the formula:

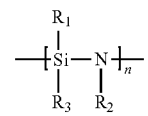

wherein:
- n=1 to 100 when repeat units are connected linearly, or n=2 to 10 when repeat units are connected cyclically;
- $R_1$ is selected from the group consisting of hydrogen, a $C_1$-$C_{18}$ unsubstituted or substituted group, a halide, an ester group, an amine group, a hydroxyl group, a cyano group, and combinations thereof;
- $R_2$ is selected from the group consisting of hydrogen, a $C_1$-$C_{18}$ unsubstituted or substituted group, a halide, an ester group, an amine group, a hydroxyl group, a cyano group, and combinations thereof; and
- $R_3$ is selected from the group consisting of hydrogen, a $C_1$-$C_{18}$ unsubstituted or substituted group, a halide, an ester group, an amine group, a hydroxyl group, a cyano group, and combinations thereof, with the proviso that at least one $R_3$ group is hydrogen.

13. The formulation of claim 9, wherein $R_4$ is selected from the group consisting of acrylate, methacrylate, vinyl ether, epoxide, cycloaliphatic epoxide, oxetane, thiol, and combinations, analogues, or derivatives thereof.

14. The formulation of claim 9, said formulation further comprising an aprotic organic solvent in a concentration from about 1 wt % to about 99 wt % in said formulation.

15. The formulation of claim 9, said formulation further comprising an inhibitor in a concentration from about 0.001 wt % to about 10 wt % in said formulation.

16. A method of making a preceramic radiation-curable resin composition, said method comprising:
(a) obtaining a first material containing first molecules comprising at least one Si—C bond, at least one Si—N bond, or at least one Si—C bond and at least one Si—N bond, wherein at least one of said first molecules comprises a silyl hydride group (Si—H) available for hydrosilylation;

(b) obtaining a second material containing second molecules with at least one unsaturated carbon-carbon double bond attached to an $R_4$ group ($R_4$—C=C), and/or at least one carbon-carbon triple bond attached an $R_4$ group ($R_4$—C≡C), wherein $R_4$ is a UV-active functional group; and (c) reacting, via hydrosilylation in the presence of a homogeneous or heterogeneous metal-containing catalyst, said first material with said second material, to generate a third material containing third molecules comprising at least one Si—C bond, at least one Si—N bond, or at least one Si—C bond and at least one Si—N bond, wherein said third molecules further comprise a $R_4$—C—C—Si sequence and/or a $R_4$—C=C—Si sequence as a hydrosilylation reaction product.

17. The method of claim 16, wherein in step (c), the molar ratio of said second molecules to said first molecules is selected from about 1 to about n, wherein n is the average number of silyl hydride groups present in each of said first molecules.

18. The method of claim 16, said method further comprising combining said third material with a catalyst quencher to capture or poison said metal-containing catalyst.

19. The method of claim 16, wherein said first molecules have the formula:

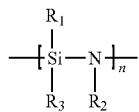

and wherein said third molecules have the formula:

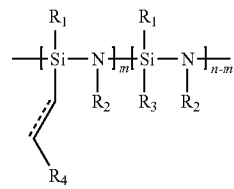

wherein:
 $m=1$ to 100 and is the number of said second molecules that react with each of said first molecules;
 $n=1$ to 100 when repeat units are connected linearly, or $n=2$ to 10 when repeat units are connected cyclically;
 $n-m$ is 0 or greater;
 $R_1$ is selected from the group consisting of hydrogen, a $C_1$-$C_{18}$ unsubstituted or substituted group, a halide, an ester group, an amine group, a hydroxyl group, a cyano group, and combinations thereof;
 $R_2$ is selected from the group consisting of hydrogen, a $C_1$-$C_{18}$ unsubstituted or substituted group, a halide, an ester group, an amine group, a hydroxyl group, a cyano group, and combinations thereof;
 $R_3$ is selected from the group consisting of hydrogen, a $C_1$-$C_{18}$ unsubstituted or substituted group, a halide, an ester group, an amine group, a hydroxyl group, a cyano group, and combinations thereof; and
 the carbon-carbon bond between $R_4$ and Si, depicted as ====, is a single bond (C—C) or a double bond (C=C).

20. The method of claim 16, said method further comprising 3D printing and thermally treating said preceramic radiation-curable resin composition to generate a ceramic material.

* * * * *